Feb. 8, 1944.  J. V. DYRR  2,341,139
POWER CONTROL OF HARROWS
Filed Sept. 14, 1940   3 Sheets-Sheet 3

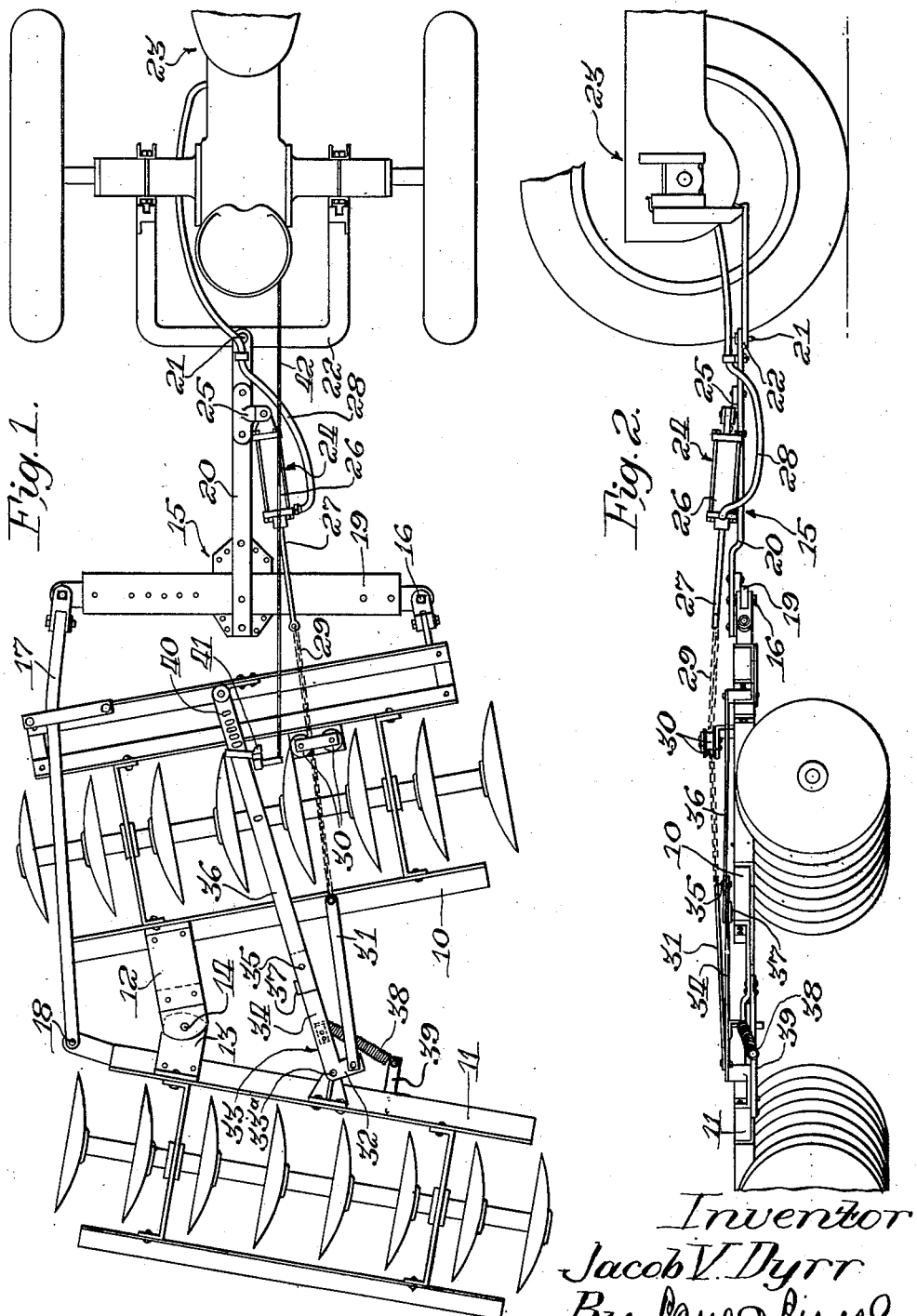

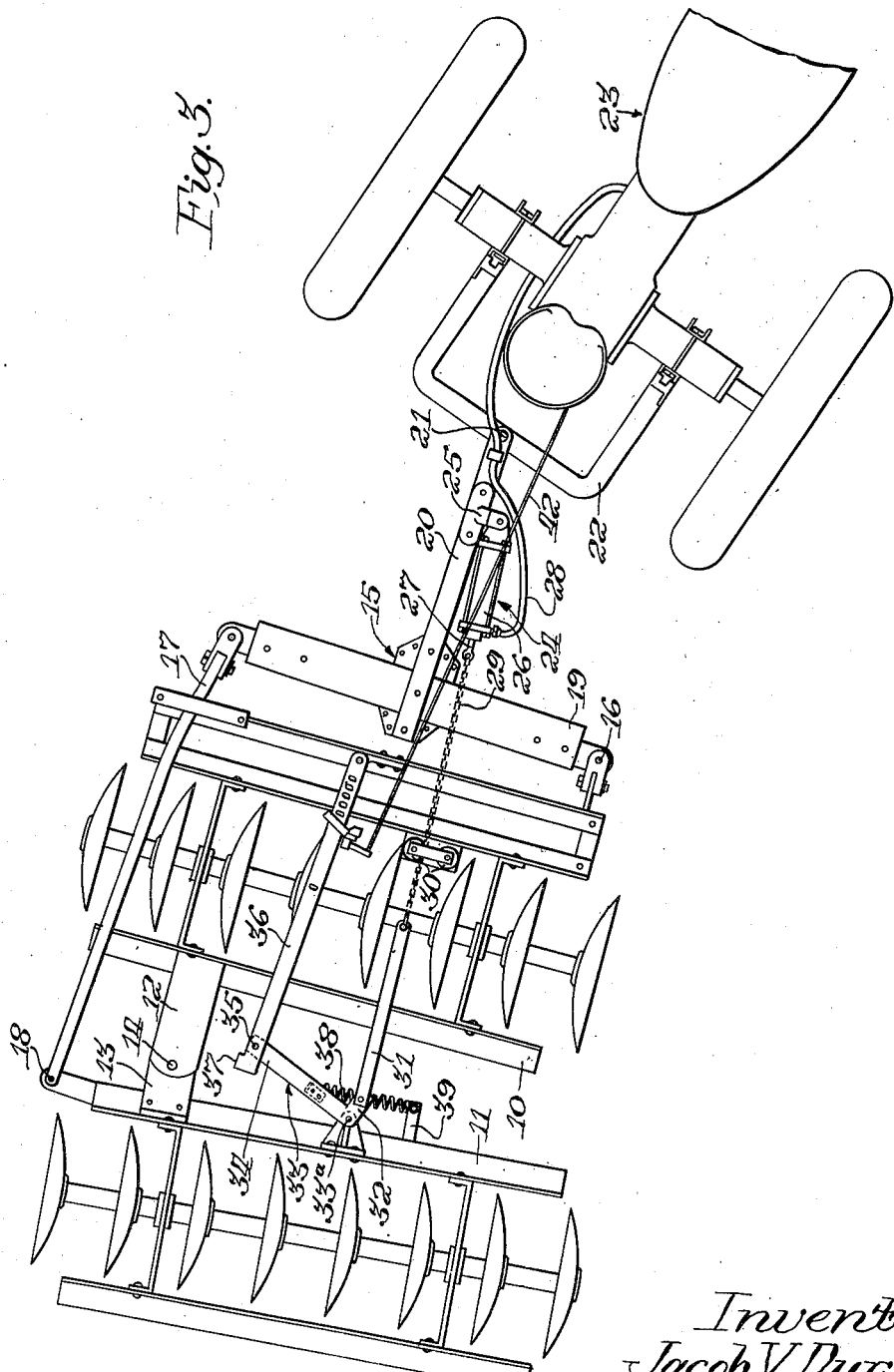

Inventor
Jacob V. Dyrr
By Paul O. Pippel
Atty.

Patented Feb. 8, 1944

2,341,139

UNITED STATES PATENT OFFICE 2,341,139

POWER CONTROL OF HARROWS

Jacob V. Dyrr, Bell, Calif., assignor to International Harvester Company, a corporation of New Jersey Application September 14, 1940, Serial No. 356,793

22 Claims. (Cl. 55—83)

This invention relates to power control of harrows. More specifically it relates to the forcing of gangs of an offset harrow from working position to transport position by means of tractor power.

It is known to straighten the gangs of a harrow by means of the power take-off shaft of the tractor pulling the harrow and also to shift the gangs of an offset harrow from normal working position to position for right-hand turn by means of an offset connection with the tractor. The present invention has to do with the shifting of the gangs of an offset harrow from working position to a right-hand turn position by means of a fluid-power device mounted on the harrow.

An object of the present invention is to produce an improved harrow.

A further object is the provision of means for adjusting the position of the gangs of an offset harrow by means of tractor power.

A further object is to provide means for releasing the gangs of a harrow from locked relationship by means of tractor power.

According to the present invention, an offset harrow comprising pivotally connected gangs is connected at the rear of a tractor by means of a hitch frame. An over-center lock holds the gangs in normal working position and is releasable by means of a fluid power device mounted on the hitch frame and actuated by the tractor.

In the drawings:

Figure 1 is a plan view of the novel harrow of the present invention in working position;

Figure 2 is a side view thereof;

Figure 3 is a plan view of the harrow with the gangs in position for a turn to the right;

Figure 4:
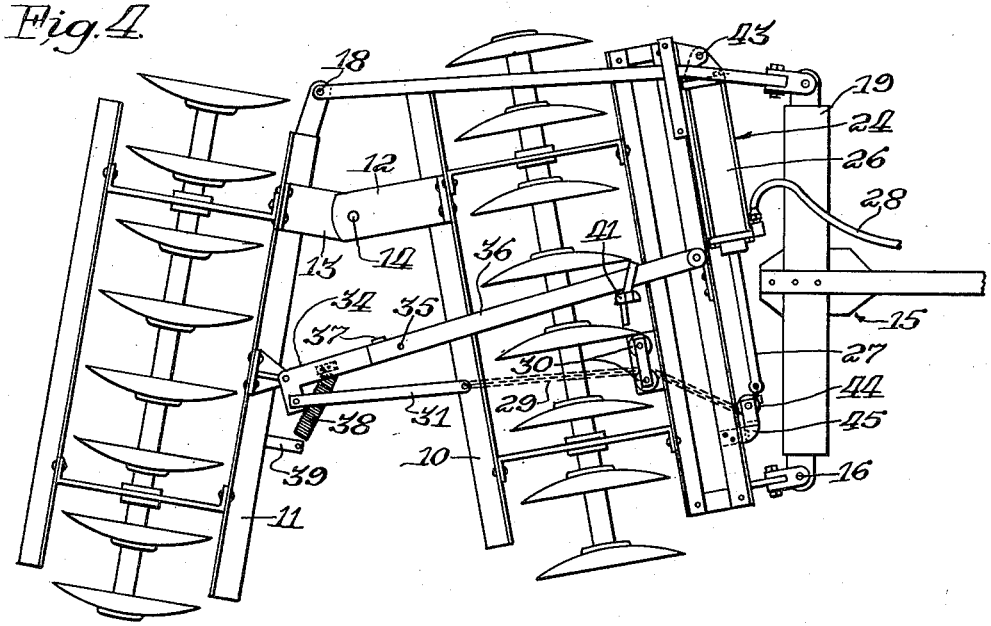
Figure 4 is a plan view of a second form of harrow according to the present invention; and, Figure 5 is a plan view of a third form of harrow.

The harrow of the present invention comprises a front gang 10, a rear gang 11 pivotally connected to the front gang by means of bracket members 12 and 13 and a pin 14, and a hitch frame 15 pivotally connected, as at 16, to one end of the front gang 10 and at the other end by means of a rearwardly extending draft member 17 to the rear frame, as at 18. The hitch frame 15 comprises a transversely extending member 19 and a longitudinally extending member 20 secured to the member 19 at its rear end and pivotally connected at its front end, as at 21, to a draw-bar 22 of a tractor 23.

A fluid-power device 24 is pivotally connected to the hitch member 20 by means of a bracket 25 and comprises a cylinder 26 and a piston, not shown, movably mounted therein and connected to a rod 27 extending from the cylinder. A hose 28 connects the fluid-power device 24 and the tractor 23 and is adapted to supply fluid under pressure from the tractor to the device so as to force the piston within the cylinder 26 toward the front end thereof. The rear end of the rod 27 has connected thereto a chain 29 extending between rollers 30 mounted on the front gang 10 to the forward end of a link 31. The rear end of the link 31 is connected to one arm 32 of a bell-crank 33, pivotally mounted at 33a having its other arm 34 pivotally connected, as at 35, to a link 36 connected to the front gang 10.

An abutment extension 37 on the link 36 and a spring 38 connecting the arm 34 of the bell crank and a part 39 extending from the rear gang 11 serve to hold the arm 34 and the link 36 in locked over-center relationship, so that the arm and the link constitute an over-center lock.

The function of this over-center lock is to hold the gangs against movement relative to one another in the working position of Figure 2. When the gangs are to be shifted for a turn to the right, fluid under pressure is supplied through the line 28 to the cylinder 26 to move the piston mounted therein forwardly. The piston exerts a forward pull on the rod 27, the chain 29, the link 31, and the arm 32 of the bell-crank 33, so as to break the over-center locked relationship of the arm 34 and the link 36 and to pull the rear gang 11 forwardly, so that the gangs occupy the relative position of Figure 3, in which a right-hand turn may be made. When the turn is completed, fluid under pressure in the cylinder 26 is released, and the draft forces upon the rear gang 11, aided by the spring 38, move the arm 34 of the bell crank 33 back into over-center relationship of the link 36, and the gangs are again locked in working position. When it is desired to transport the gangs, the piston within the cylinder 26 is moved by the action of fluid under pressure until the gangs assume a parallel position.

The angle of the gangs in working position is determined by the connection of the link 36 with the front gang 10. The forward end of the link 36 has a series of holes 40 therein, any one of which is engageable by a latch 41 under control of an operator on the tractor by means of a cord 42. The particular hole 40 engaged by the latch determines the effective length of the link 36 and, accordingly, the relative angle between the gangs in working position.

Figure 4 shows a modified form in which a fluid-power device 24 is mounted at 43 on the front gang 10 at the end thereof opposite the end at which the hitch frame 15 is pivotally attached as at 16. The cylinder 26 and rod 27 connected to the piston within the cylinder, not shown, extend transversely of the gang. Chain 29 extends from the end of the rod 27 transversely and then around a roller 44 mounted on a bracket 45 and then longitudinally between rollers 30 to link 31 as in the form of Figure 1.

Figure 5:
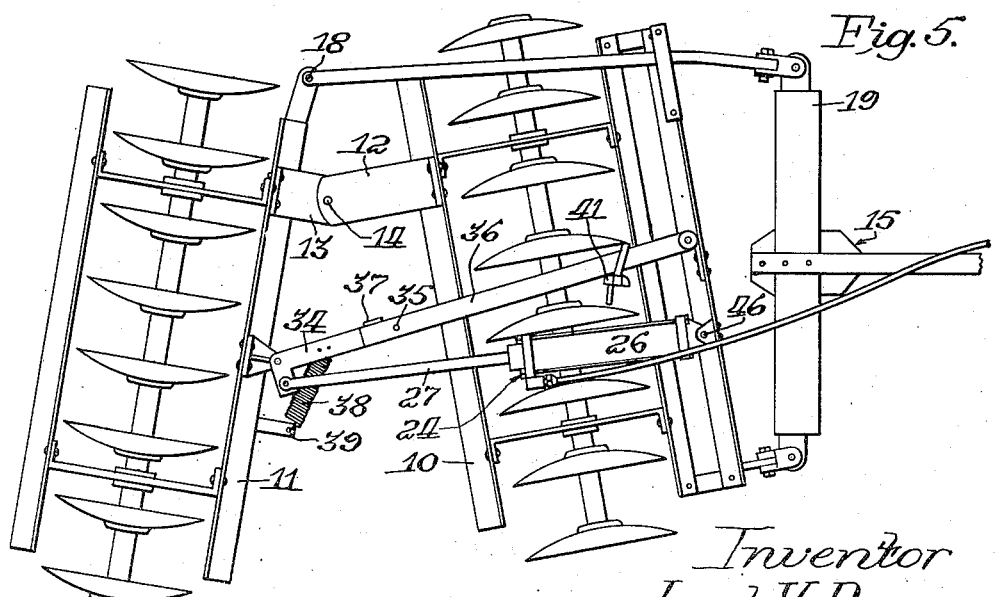

Figure 5 shows a modification in which a fluid-power device 24 is mounted at 46 on the front gang, and rod 27 extending from cylinder 26 is connected directly to bell crank 33, chain 29 and link 31 being omitted.

It will be apparent from the foregoing description that a new and novel harrow construction has been provided, according to which tractor power is used for releasing the gangs of an offset harrow from locked relationship and for moving the gangs from working position either to transport position or to position for a right turn.

It is the intention to limit the invention only within the scope of the appended claims.

What is claimed is:

1. In combination, a tractor having a power plant, a harrow connected at the rear of the tractor and comprising gangs connected for relative angular movement and means including an over-center lock for holding the gangs against relative movement, and means connecting the holding means and the tractor power plant for releasing the holding means.

2. In combination, a tractor having a power plant, a harrow connected at the rear of the tractor and comprising gangs connected for relative angular movement and means for holding the gangs against relative movement, a fluid-power device mounted on the harrow, means connecting the fluid-power device with the holding means for releasing the same, and means connecting the fluid-power device and the tractor power plant.

3. The combination specified in claim 2, the holding means comprising an over-center lock.

4. The combination specified in claim 2, the harrow being an offset harrow.

5. In combination, a tractor having a power plant, a harrow positioned at the rear of the tractor and comprising two gangs connected for relative angular movement, and means holding the gangs against relative movement, a hitch frame connecting the tractor with the harrow, a fluid-power device mounted on the hitch frame, means connecting the fluid-power device with the holding means for releasing the same, and means connecting the fluid-power device and the tractor power plant.

6. The combination specified in claim 5, the holding means comprising an over-center lock.

7. In combination, a tractor having a power plant, a harrow connected at the rear of the tractor and comprising two gangs connected for relative movement, and means for holding the gangs against relative movement, said means comprising a link connected to one gang, a bell crank pivotally connected to the other gang and having one arm connected to the link, and yielding means holding the bell-crank and link in straight line relation, and means connecting the other arm and the tractor power plant for releasing the holding means.

8. In combination, a tractor having a power plant, a harrow connected at the rear of the tractor and comprising two gangs connected for relative movement and means for holding the gangs against relative movement, said means comprising a link pivotally connected to one gang, a bell crank pivotally connected to the other gang and having one arm connected to the link, and yielding means holding the bell-crank and link in straight line relation, a fluid-power device mounted on the harrow, means connecting the fluid-power device with the other arm of the bell-crank, and means connecting the fluid-power device and the tractor power plant.

9. In combination, a tractor having a power plant, a harrow positioned at the rear of the tractor and comprising front and rear gangs connected for relative movement and means for holding the gangs against relative movement, said means comprising a link pivotally connected to the front gang, a bell-crank pivotally connected to the rear gang and having one arm connected to the link, and yielding means holding the bell-crank and link in straight line relation, hitch means connecting the harrow to the tractor, a fluid-power device mounted on the hitch means, means connecting the fluid-power device with the other arm of the bell-crank, and means connecting the fluid-power device and the tractor power plant.

10. In combination, a tractor having a power plant, a harrow positioned at the rear of the tractor and comprising forward and rearward gangs connected for relative angular movement, and means holding the gang against relative movement, a hitch frame connecting the tractor with the harrow, a fluid-power device mounted on the forward gang, means connecting the fluid-power device with the holding means for releasing the same, and means connecting the fluid-power device and the tractor power plant.

11. In combination, a tractor having a power plant, a harrow positioned at the rear of the tractor and comprising two gangs connected for relative angular movement, and means holding the gang against relative movement, a hitch frame connecting the tractor with the harrow, a fluid-power device mounted on the one gang, means connecting the fluid-power device with the holding means for releasing the same, and means connecting the fluid-power device and the tractor power plant.

12. The combination specified in claim 11, the holding means comprising an over-center lock.

13. In combination, a tractor having a power plant, a harrow positioned at the rear of the tractor and comprising front and rear gangs connected for relative angular movement, a hitch frame connecting the tractor with the harrow, a fluid-power device mounted on the front gang and extending transversely thereof for shifting the gangs with respect to one another, and means connecting the fluid-power device and the tractor power plant.

14. In combination, a tractor having a power plant, a harrow positioned at the rear of the tractor and comprising front and rear gangs connected for relative angular movement, means holding the gangs against relative movement, a hitch frame connecting the tractor with the harrow, a fluid-power device mounted on the front gang and extending transversely thereof, means connecting the fluid-power device with the holding means for releasing the same, and means connecting the fluid-power device and the tractor power plant.

15. In combination, a tractor having a power plant, a harrow positioned at the rear of the tractor and comprising front and rear gangs connected for relative movement and means for holding the gangs against relative movement, said means comprising a link pivotally connected to the front gang, a bell-crank pivotally connected to the rear gang and having one arm connected to the link, and yielding means holding the bell-crank and link in straight line relation, hitch means connecting the harrow to the tractor, a fluid-power device mounted on the front gang and extending transversely thereof, means connecting the fluid-power device with the other arm of the bell-crank, and means connecting the fluid-power device and the tractor power plant.

16. In combination, a tractor having a power plant, a harrow positioned at the rear of the tractor and comprising front and rear gangs connected for relative movement, a fluid-power device mounted on the front gang and extending transversely thereof, guide means mounted on the front gang, flexible means connected to the fluid-power device and extending transversely to the guide means and thence rearwardly to the rear gang, and means connecting the fluid-power device to the tractor power plant.

17. In combination, a tractor having a power plant, a harrow positioned at the rear of the tractor and comprising front and rear gangs connected for relative movement, means for holding the gangs against relative movement, a fluid-power device mounted on the front gang and extending transversely thereof, guide means mounted on the front gang, flexible means connected to the fluid-power device and extending transversely to the guide means and thence rearwardly to the holding means, and means connecting the fluid-power device to the tractor power plant.

18. In combination, a tractor having a power plant, an offset harrow connected at the rear of the tractor and comprising a pair of gangs connected for relative angular movement and means for holding the gangs against relative movement, and means connecting the tractor power plant with the holding means and with one gang for releasing the holding means and for shifting the said one gang with respect to the other gang.

19. In combination, a tractor having a power plant, a harrow connected to the tractor and having a gang part and another part connected to one another for relative movement, means holding the parts against relative movement in a certain relative position, adjusting means for moving the parts from the certain relative position, means connecting the tractor power plant and the adjusting means for supplying power to actuate the adjusting means, and means connecting the adjusting means and the holding means for causing application of power to the adjusting means to make the holding means release the parts for relative movement.

20. The combination specified in claim 19, both of the parts of the harrow being gangs.

21. In combination, a tractor having a power plant, a harrow connected at the rear of the tractor and comprising gangs connected for relative angular movement and an over-center lock for holding the gangs against relative movement, and means connecting the holding means and the tractor power plant for releasing the over-center lock.

22. In combination, a tractor having a power plant, an implement connected to the tractor for propulsion thereby and including relatively adjustable earth tillage tool sets reactable against the earth while being propelled by the tractor to create an earth reaction force urging such tool sets toward one position of adjustment, an adjusting and holding linkage comprising pivotal members respectively pivotally connected with said tool sets and pivotally connected with one another, said pivotal members being pivotable into a relatively mutually aligned bracing position to establish and brace the tools in the one adjustment, means urging the pivotal members into said aligned bracing position to augment said earth reaction force in establishing the one position of the tool sets and to releasably hold the pivotal members in their alignment bracing position, said pivotal members being pivotable from their bracing position into relatively angular positions for effecting additional adjustment of the tool sets, a fluid-actuated device energizable from the tractor power plant and connected with said members for pivoting them from their bracing position when energized, and means manually operable to control such energization of the device.

JACOB V. DYRR.